Nov. 19, 1968     E. ORSHANSKY, JR     3,411,381

SPLIT TORQUE TRANSMISSION

Filed Sept. 8, 1966

INVENTOR
ELIAS ORSHANSKY, JR.
BY
Owen, Wickersham & Erickson
ATTORNEYS

United States Patent Office 3,411,381
Patented Nov. 19, 1968

3,411,381
SPLIT TORQUE TRANSMISSION
Elias Orshansky, Jr., San Francisco, Calif., assignor to
URS Corporation, Burlingame, Calif., a corporation
of California
Filed Sept. 8, 1966, Ser. No. 578,061
2 Claims. (Cl. 74—687)

ABSTRACT OF THE DISCLOSURE

A hydrodynamical transmission of the type having a planetary gear set with an input shaft secured to its input means, an output shaft secured to its output means, and a hydraulic system connected to its reaction means and having a pair of pump-motors connected to each other by hydraulic conduits, so that when one acts as a pump, the other acts as a motor, one pump-motor acting as a pump for reaction on the reaction means, the other one being connected to the output shaft, so that the system acts as a torque divider. There are four clutches, one between the second pump-motor and the output shaft, one between the second pump-motor and the input shaft, one (normally disengaged) for directly connecting the input and output shafts, and one (normally engaged) for connecting the first pump-motor to the reaction means.

---

This invention relates to an improved split torque transmission. More particularly, it provides a hydromechanical system which enables efficient operation over a wider range of speed and torque variation.

The prior art includes hydromechanical transmissions of the type having an input shaft drive one member of a planetary gear set (such as a sun gear) and having an output shaft driven by a second member of the planetary gear set (such as a set of planet gears that engage the sun gear), which in turn is in engagement with a reaction member (such as a ring gear). The reaction for the ring gear has been provided by a hydraulic system including a first pump-motor near the reaction ring gear connected to a second pump-motor by a pair of hydraulic lines, the second pump-motor being operatively connected to drive the output shaft. Thus, the torque has been split, some of the input torque being transmitted to the output shaft through the planetary gear engagement and some of it being transmitted through the hydraulic system via the pump-motors.

Without the hydraulic system, if the ring gear were held stationary, the output shaft would run slower than the input shaft at a fixed reduction ratio. With the ring gear connected to the first pump-motor, then the first pump-motor acts as a pump and as reaction for the ring gear. If the pump remains stationary, because the second pump-motor has zero displacement, hydraulic pressure is developed without changing the speed, and no horsepower is transmitted through the hydraulic system, but pressure is developed by torque reaction. With this pump connected hydraulically to the second pump-motor (used as a motor) the pump supplies pressure and flow to the motor that is in engagement with the output shaft; then the ring gear is able to roll back at a speed determined by the displacement of the second pump-motor, under the influence of reaction so that the output shaft under those circumstances goes slower and needs more torque to maintain constant horsepower. Therefore, in this instance, the hydraulic pump-motor combination adds torque to the output shaft.

The present invention changes the above described well-known system in a manner which enables it to obtain much more efficient operation, over a wide range of speeds.

The invention finds, for example, valuable application as a transmission for trucks and other types of highway vehicles. In driving a truck with this invention, the split-torque transmission makes it possible to accomplish unusually high efficiency, much higher than an all-hydraulic transmission or other transmissions of the prior art, with very much smaller pump-motors. For example, where a 100-cublic-inch pump motor would have been required in the prior art, a displacement of approximately ten cubic inches is sufficient in the present system.

Other objects and advantages of the invention will appear from the following description of a preferred form thereof. It will be understood that the invention can be comprehended more easily after an explanation of the elements involved.

Figure 1:
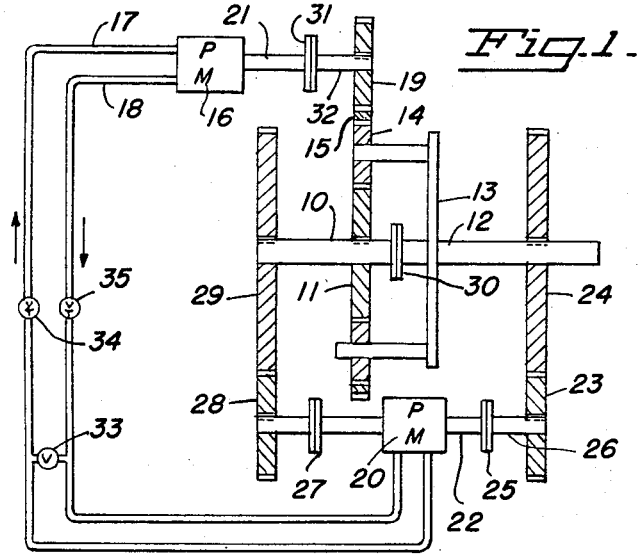
FIG. 1 is a schematic view of a split torque transmission embodying the principles of the invention.
Figure 2:
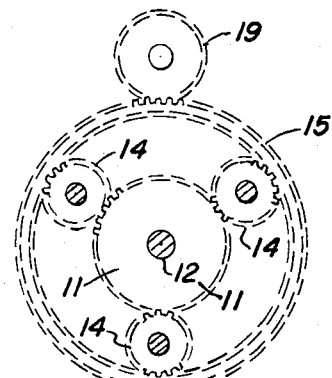
FIG. 2 is a simple sectional diagram of the planetary gearing system to illustrate what is involved.

FIG. 1 shows a system of the invention. One type of planetary gearing, using a ring gear is illustrated, but it will be apparent that other types of planetary gearing which perform the same function may be used. An input shaft 10 is connected to a sun gear 11, and an output shaft 12 is connected to a planet carrier 13 of a set of planetary gears 14, in engagement with the sun gear 11. The planetary gears 14 are also in engagement with a reaction ring gear 15. The reaction ring gear 15 is operated hydraulically, with the aid of a pump-motor 16 having a conduit 17 leading from its outlet and a conduit 18 leading to its inlet. The pump-motor 16 has its shaft 21 driven by a gear 19 meshed with the ring gear 15. A pump-motor 20 at the other end of the conduits 17 and 18, in normal systems, has its shaft 22 operatively connected to the output shaft 12 through a gear 23 engaged with a gear 24 secured to the shaft 12.

In the present invention I provide a normally-engaged first clutch 25 between the pump-motor 20 and the output shaft 12, preferably ahead of the gear train 23, 24; for example, it may connect the shaft 22 to a shaft 26 of the gear 23. This enables the pump-motor 20 to be disengaged from the output shaft 12 at will. I also provide a normally disengaged clutch 27 between the pump-motor 20 and the input shaft 10, acting through a gear train 28, 29, which enables the pump-motor 20 to be placed in or out of engagement with the input shaft 10. The clutch 27 may, for example, be between the shaft 22 and the shaft for the gear 28.

Further, I provide a normally disengaged clutch 30 which directly connects the input shaft 10 to the output shaft 12 for a direct running operation which will be explained in a moment, and a normally engaged clutch 31 between the pump-motor 16 and the reaction ring gear 15, for example, between the shaft 21 and a shaft 32 of the gear 19.

In my system there is a condition which I call middle lockout, at which the two clutches 25 and 27 can be either engaged or disengaged without making any practical difference. At middle lockout the pump-motor 16 is at full stroke acting as reaction for the ring gear 15 and the pump-motor 20 is on zero stroke performing no useful work, so that it does not spin with parasitic drag, if the clutches 25 and 27 are disengaged. Hence, during this time, the two clutches 25 and 27 can be disengaged. This means that the clutches 25 and 27 can be engaged and disengaged at the same speed and that there is at this condition no wear and tear on the pump-motors 16 and 20 for neither of them is doing any work, and there is no wasting of horsepower.

For speeds lower than middle lockout (we are still considering the clutch 30 as being disengaged and the clutch 31 in its normal engagement position), the clutch 25 is engaged and the clutch 27 is disengaged, and the motor-pump 16 acts as a pump and the pump-motor 20 acts as a motor; the torque is increased and divided with the hydraulic output torque added to the planetary output.

For speeds higher than middle lockout, the input clutch 27 is engaged and the output clutch 25 is disengaged. The pump-motor 20 then acts as a pump and the pump-motor 16 then acts as a motor driven by hydraulic fluid coming from the pump 20. As a result, the pump-motor 20 abstracts some of the torque from the input drive and uses that torque to speed up the ring gear 15 through the pump-motor 16. As a result the output shaft 12 goes faster.

When the output shaft 12 reaches its maximum speed, it is moving at substantially the same speed as the input shaft 10. At this maximum speed the clutch 30 is engaged and the transmission is then in a condition which I call top lockout. The clutch 30 thus connects the input shaft 10 and output shaft 12 directly, there is a direct mechanical drive between them. When this has been done, the clutch 27 can be disengaged and so can the clutch 31. Disengagement of the clutch 31 is possible because the hydraulic system then satisfies no need, and there is no use in running it.

The four clutches engage at times at which both members of each clutch are rotating at substantially the same speed; so there is no horsepower wasted, engagement and disengagement is quite simple. As a result, the invention provides a very fine vehicle transmission for trucks, trains, and other cargo carriers moving on highways or rails. It is possible to use any variable displacement motor-pump for the members 16 and 20 and any kind of clutches for all four of the clutches 25, 27, 30 and 31.

When a truck is being driven across country, it can run about 90% of the time in the direct-drive top-lockout position. When the speed is dropped toward middle lockout, the clutch 30 is disengaged, and the clutches 31 and 27 are re-engaged, for example, as the truck finds itself pulling in going uphill. Speeds at or below middle lockout occur only a very tough hills or when starting with a heavy load. At middle lockout, the clutch 25 is re-engaged, and the clutch 27 is disengaged. This leaves the normal hydromechanical type of system with the normal type of torque division.

Figure 3:
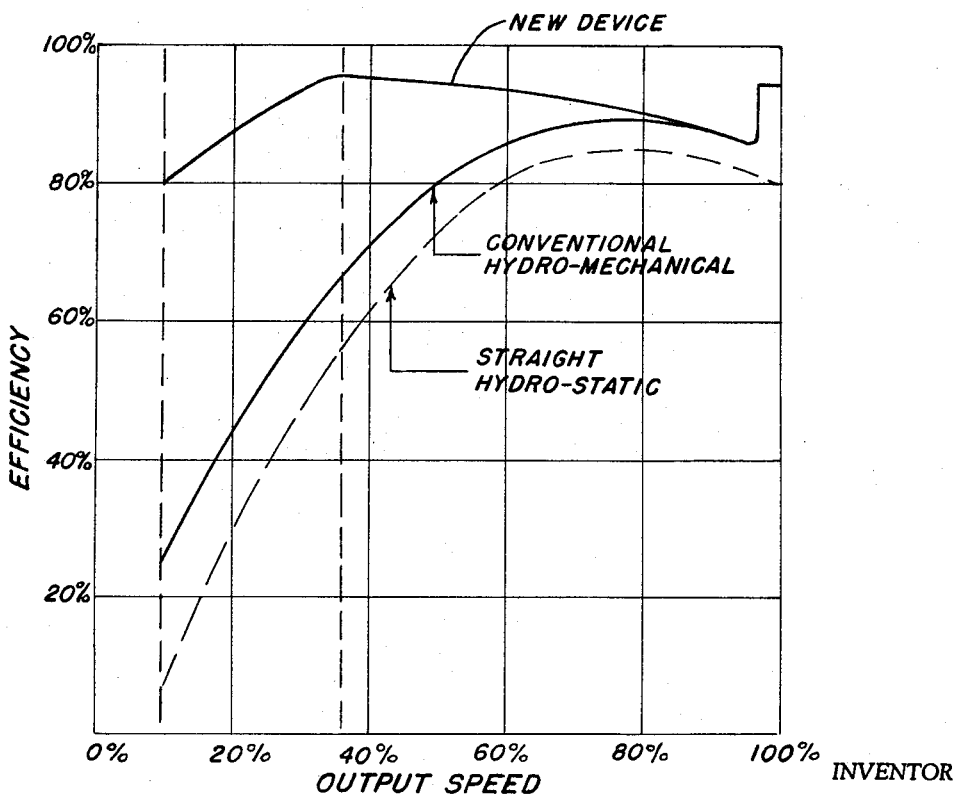
FIG. 3 is a curve of the operating efficiencies of the system in comparison with the operation of a conventional straight hydrostatic transmission and a conventional hydromechanical transmission.

Referring to the diagram of FIG. 3, it will be seen that both a conventional hydromechanical system and a conventional hydrostatic system reach top efficiencies at about 75% of full speed. From that, the efficiencies of both decrease slowly on each side. This is from somewhere around 85% or 90% down to about 80%, at speeds corresponding to the top lockout of the present invention, jumping to about 95% at top lockout in the hydromechanical system only. There is an even sharper drop at lower speeds.

In my invention, a near 100%, say about 96% efficiency, is achieved at middle lockout which may stand for about forty miles per hour on a typical truck and also at top lockout, when the change is again made to the fully mechanical system. The drop-off at speeds in between middle and top lockout drops slowly but remains higher than the efficiency of the prior-art systems. At lower speeds, the drop-off is much less marked than in prior-art systems.

Thus the system of the invention achieves greater efficiencies than an all-hydraulic system and has advantages that the hydraulic system gives to the mechanical system.

Another very important feature of the invention is the relatively low cost of this installation. The systems are readily available, very few parts are required, and these are relatively inexpensive. The cost appears to be about one-fourth of the cost of installing an adequate hydraulic system, partly because of the low capacity of the torque-divided pump-motors as compared with full hydraulic pumps and motors. The space taken up is very small too, because such small displacement pump-motors can be used.

In my system reverse is accomplished by reversing the direction of operation of the pump-motor 20 when it is connected to the output shaft 12 and is at its maximum displacement, and reducing the displacement of the pump-motor 16.

Neutral may be accomplished in two ways: (1) by opening a by-pass valve 33 between the conduits 17 and 18 or (2) by setting the displacement of the unit connected to the ring gear 15 to zero.

Throttling valves 34 and 35 may be interposed in each of the hydraulic lines 17 and 18 to produce braking or retardation beyond the braking supplied by the power plant.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. In a hydrodynamical transmission of the type having planetary gear means having input means, output means, and reaction means, an input shaft secured to said input means and driven by a motive force, an output shaft secured to said output means, and a hydraulic system connected to said reaction means and having a first pump-motor for acting as a pump for reaction on said reaction means, and a second pump-motor connected to said first pump-motor by a pair of hydraulic conduits and acting as a motor when said first pump-motor acts as a pump, said first pump-motor acting as a motor when said second pump-motor acts as a pump, said second pump-motor being connected to said output shaft, so that said system acts as a torque divider, the torque from said input shaft being divided between said planetary gear means and said hydraulic system and applied to said output shaft, the improvement comprising:
   first clutch means between said second pump-motor and said output shaft,
   second clutch means, between said second pump-motor and said input shaft,
   third, normally disengaged, clutch means to connect said input shaft directly to said output shaft, and
   fourth, normally engaged, clutch means connecting said first motor-pump to said reaction means.

2. In a hydrodynamical transmission of the type having a sun gear, a set of planet gears engaging said sun gear, and a ring gear engaging said planet gears, an input shaft secured to said sun gear and driven by a motive force, an output shaft secured to said planet gears, and a hydraulic system connected to said ring gear and having a first pump-motor adjacent said ring gear for acting as a pump for reaction on said ring gear, and a second pump-motor connected to said first pump-motor by a pair of hydraulic conduits and acting as a motor when said first pump-motor acts as a pump, said first pump-motor acting as a motor when said second pump-motor acts as a motor, said second pump-motor being connected to said driven shaft, so that said system acts as a torque divider, the torque from said input shaft being divided between said gears and said hydraulic system and applied to said output shaft, the improvement comprising:
   first clutch means between said second pump-motor and said output shaft,
   second clutch means between said second pump-motor and said input shaft,
   third, normally disengaged, clutch means to connect said input shaft directly to said output shaft, and
   fourth, normally engaged, clutch means connecting said first motor-pump to said ring gear.

References Cited

UNITED STATES PATENTS

| | | | |
|---|---|---|---|
| 2,082,473 | 6/1937 | Tyler | 60—53 |
| 2,517,188 | 8/1950 | Feng | 74—687 |
| 2,830,468 | 4/1958 | Waring | 74—687 |
| 2,897,688 | 8/1959 | Graybill | 74—687 |

FOREIGN PATENTS

| | | |
|---|---|---|
| 245,707 | 7/1963 | Australia. |

ARTHUR T. McKEON, *Primary Examiner.*